UNITED STATES PATENT OFFICE.

ORION B. MELLICK, OF BLOOMSBURG, PENNSYLVANIA.

FIRE-PROOF PAINT.

SPECIFICATION forming part of Letters Patent No. 240,746, dated April 26, 1881.

Application filed February 7, 1881. (No specimens.)

*To all whom it may concern:*

Be it known that I, ORION BOYD MELLICK, of Bloomsburg, in the county of Columbia and State of Pennsylvania, have invented certain new and useful Improvements in a certain Compound called "Elastic Fire-Proof Paint," of which the following is a specification.

My compound or composition consists of the following ingredients, combined in the proportions stated: To one gallon coal-tar add one-half ounce sulphuric acid. To one barrel of tar and acid add as much gum of india-rubber as one gallon boiled linseed-oil and three gallons benzine will dissolve; then add one pound oxide iron, one pound Rosedale cement, one pound air-slaked lime, and thin or use as a drier by adding one-half pint benzine to gallon of mixture. By thus treating the tar with the sulphuric acid the injurious or oxidizing properties of the tar are destroyed or neutralized.

This compound is very easily made and can be used or applied in any ordinary way to roofs or other parts of buildings, or to any structure where it is desired to secure protection from the atmosphere, rain, or heat. It not only is very useful and durable, but it also presents a very handsome appearance to the eye.

What I claim, and desire to secure by Letters Patent, is—

The herein-described compound or composition of matter, consisting of coal-tar, sulphuric acid, gum of india-rubber, boiled linseed-oil, benzine, oxide of iron, cement, and lime, substantially in the proportions hereinbefore specified.

In testimony that I claim the foregoing as my own I affix my signature in presence of two witnesses.

ORION BOYD MELLICK.

Witnesses:
 JESSE BOWER,
 THOMAS W. LLOYD.